United States Patent [19]

Shelly

[11] Patent Number: 5,155,187
[45] Date of Patent: Oct. 13, 1992

[54] POLYMERIZATION METHOD

[75] Inventor: Javan Shelly, Cincinnati, Ohio

[73] Assignee: Quantum Chemical Corporation, New York, N.Y.

[21] Appl. No.: 649,099

[22] Filed: Feb. 1, 1991

Related U.S. Application Data

[62] Division of Ser. No. 427,071, Oct. 25, 1989, Pat. No. 5,001,099.

[51] Int. Cl.$^5$ ............................... C08F 4/68
[52] U.S. Cl. .................... 526/116; 526/113; 526/114; 526/348.6; 526/352; 526/119; 526/128; 502/113; 502/117
[58] Field of Search ............... 526/116, 113, 114, 119, 526/128

[56] References Cited

U.S. PATENT DOCUMENTS

| | | | |
|---|---|---|---|
| 4,252,670 | 2/1981 | Caunt et al. | 252/429 B |
| 4,283,515 | 8/1981 | Gibbs | 526/127 |
| 4,295,992 | 10/1981 | Gibbs | 252/439 C |
| 4,496,660 | 1/1985 | Gessell et al. | 502/111 |

FOREIGN PATENT DOCUMENTS

| | | |
|---|---|---|
| 0020808 | 1/1981 | European Pat. Off. |
| 0136113 | 4/1985 | European Pat. Off. |

Primary Examiner—Joseph L. Schoffer
Assistant Examiner—David Wu
Attorney, Agent, or Firm—Kenneth D. Tremain; Richard G. Jackson

[57] ABSTRACT

The present disclosure is directed to a catalyst comprising the reaction product of:
 (a) a silicon-containing compound having the structural formula $R_{4-n}SiX_n$—where R is $C_1$-$C_{10}$ hydrocarbyl; X is halogen; and n is an integer of 1 to 4;
 (b) a magnesiumdialkyl having the structural formula $R^1R^2Mg$, where $R^1$ and $R^2$ are the same or different and are $C_2$-$C_{10}$ alkyl;
 (c) an alcohol having the structural formula $R^3OH$, where $R^3$ is $C_1$-$C_{10}$ hydrocarbyl;
 (d) a halide-containing metal compound, said metal selected from the group consisting of titanium, zirconium and vanadium;
 (e) an aluminum alkoxide having the structural formual $Al(OR^5)_3$, where $R^5$ is $C_2$-$C_4$ alkyl; and
 (f) a halide-containing metal compound said metal selected from the group consisting of titanium, zirconium and vanadium, with the proviso that said reaction product is formed from said components (a) to (f) reacted in the order recited but for the interchangeability of components (a) and (b).

The catalyst of this disclosure is useful, when provided in a catalytically effective amount and in the presence of co-catalytically effective amount of an organoaluminum compound, in the polymerization of alpha-olefins.

10 Claims, No Drawings

POLYMERIZATION METHOD

This is a divisional of copending application Ser. No. 427,071, filed on Oct. 25, 1989 now U.S. Pat. No. 5,01,099.

BACKGROUND OF THE DISCLOSURE

1. Field of the Invention

The present invention is directed to a polymerization catalyst. More particularly, the present invention is directed to a catalyst useful in the polymerization of at least one alpha-olefin.

2. Background of the Prior Art

There is a probably no subdivision of catalysis that has been as thoroughly developed as the catalytic polymerization of olefin polymers. Catalysts employed in the polymerization of olefins, especially alpha-olefins, more particularly, ethylene, have been the subject of innumerable patents and technical articles. In recent years, a particularly active sector of this technology has focused upon the catalytic formation of so-called "linear low density polyethylene" (LLDPE).

LLDPE, although employed in similar applications as earlier developed low density polyethylene (LDPE), represents an advance in the art in that the polymerization of LLDPE is far less difficult than is the polymerization of LDPE. That is, whereas LDPE is polymerized under very high pressure, with all the complications attendant therewith, more recently developed LLDPE is polymerized at far lower pressure, simplifying and easing the costs and complications of this reaction. Because LDPE and LLDPE, although chemically distinct, can be utilized in the same applications, this new polymer has rapidly grown in commercial importance.

The development of LLDPE has spurred a parallel development of catalysts useful in its polymerization. Two major goals have been focused upon in evaluating a catalyst useful in the polymerization of LLDPE. The first of these factors is the effect of the catalyst on higher alpha-olefin comonomer incorporation in the LLDPE. As those skilled in the art are aware, LLDPE is a copolymer of ethylene and a higher alpha-olefin, usually a $C_4$ to $C_{10}$ alpha-olefin. A common problem associated with the catalysts of the prior art employed to polymerize LLDPE has been the poor incorporation of the higher alpha-olefin in the final copolymer.

A LLDPE typically incorporates up to about 10 weight percent of a higher alpha-olefin, based on the total weight of the ethylene-higher alpha-olefin copolymer. Although only up to about 10 weight percent of the higher alpha-olefin is included in the copolymer, unfortunately, a much higher concentration of the higher alpha-olefin must be reacted to produce this result. This, of course, results in higher processing expense in that the higher alpha-olefin must be heated and pressurized although it is not polymerized. Thus, an aim of LLDPE catalyst designers continues to be the development of a catalyst which more efficiently incorporates the higher alpha-olefin monomer charged in the polymerization reactor into the copolymer product.

The second major goal by which a catalyst is judged in the polymerization of LLDPE is its hydrogen response That is, hydrogen is charged into ethylene polymerization reactors to modify the polymer's degree of polymerization. This degree of polymerization is manifested, in the case of an ethylene polymer, by its melt index. If the degree of polymerization is too high, its viscosity is excessive, as defined by a very low melt index. Thus, hydrogen is incorporated in the polymerization reaction to ensure that the degree of polymerization is not excessive. That is, hydrogen is added to guarantee that the LLDPE melt index is sufficiently high. As in the case of higher alpha-olefin incorporation, increasing inclusion of hydrogen increases the cost of polymerization. That is, greater concentrations of unreacted hydrogen result in greater thermodynamic costs of heating and pressurization. Thus, the lesser amounts of hydrogen necessary to produce reasonable melt index LLDPE products result in more attractive polymerization. This result is a function of the polymerization catalyst. Thus, a critical property of a LLDPE catalyst is its so-called "hydrogen response," the ability of the catalyst to efficiently utilize the hydrogen present to modify the degree of polymerization of the LLDPE product.

The development of LLDPE polymerization catalysts has not, in the prior art, reached a point where these desirable properties have been optimized. There are, however, a multiplicity of known catalysts which will be recognized as being similar, in their method of formation, to the catalyst of the present invention.

For example, U.S. Pat. No. 4,252,670 describes an olefin polymerization catalyst formed by treating a magnesium hydrocarbyl, or a complex or mixture of a magnesium hydrocarbyl compound and an aluminum hydrocarbyl compound, with at least one halogenating agent; reacting this product with a Lewis Base, which may be an ether, an ester, a ketone, an alcohol, a thioether, a thioester, a thioketone, a thiol, a sulfone, a sulfonamide or the like; and then reacting the thus formed reaction product with titanium tetrachloride U.S. Pat. No. 4,496,660 describes a catalyst for the polymerization of olefins which is initially the reaction product of a hydrocarbyl magnesium compound or a bonded mixture of a hydrocarbyl magnesium and a hydrocarbyl aluminum, zinc or boron, and an oxygen-containing and/or nitrogen-containing compound, such as an alcohol or an amine. This initial reaction product is reacted with a halide source, a halide-containing aluminum, silicon, tin, phosphorus, sulfur, germanium, carboxy, hydrogen, hydrocarbyl or Group IV-B metal, Group V-B metal, Group VI-B metal compound or mixtures thereof. This product, in turn, is reacted with a transition metal compound, which may be titanium tetrachloride, and with a reducing agent, a boron, aluminum, zinc or magnesium organic compound, to form the catalyst.

U.S. Pat. No. 4,295,992 describes an olefin polymerization catalyst formed by the reaction of an aliphatic alcohol with a mixture of an dialkylmagnesium compound and a silicon tetrahalide. This product is then treated with an organic titanium compound, such as titanium tetrachloride, and, finally, with a suitable reducing agent, such as diethylaluminum chloride.

Although the above discussed prior art disclosures advance the art involving the catalytic polymerization of alpha-olefins, none of them, nor any other of innumerable other prior art references, are particularly useful in the polymerization of LLDPE. That is, no polymerization catalyst has been identified which both polymerizes ethylene and is characterized by excellent hydrogen response as well as higher alpha-olefin copolymer incorporation capability.

SUMMARY OF THE INVENTION

A new catalyst has now been developed which is particularly suited for polymerization of linear low density polyethylene in that it provides both excellent capability of higher alpha-olefin incorporation and excellent hydrogen response. Its use in the polymerization of ethylene and a higher alpha-olefin results in the formation of LLDPE with minimum excess higher alpha-olefin comonomer and minimum hydrogen usage consistent with the polymerization of the desired LLDPE.

In accordance with the present invention, a catalyst is provided. The catalyst comprises the reaction product of:

(a) a silicon-containing compound having the structural formula $R_{4-n}SiX_n$, where R is $C_1$-$C_{10}$ hydrocarbyl; X is halogen; and n is an integer of 1 to 4;

(b) a magnesiumdialkyl having the structural formula $R^1R^2Mg$, where $R^1$ and $R^2$ are the same or different and are $C_2$-$C_{10}$ alkyl;

(c) an alcohol having the structural formula $R^3OH$, where $R^3$ is $C_1$-$C_{10}$ hydrocarbyl;

(d) a halide-containing metal compound, said metal selected from the group consisting of titanium, zirconium and vanadium;

(e) an aluminum alkoxide having the structural formula $Al(OR^5)$ where $R^5$ is $C_2$-$C_4$ alkyl; and (f) a halide-containing metal compound, said metal selected from the group consisting of titanium, zirconium and vanadium, with the proviso that said reaction product is formed from said components (a) to (f) reacted in the order recited except for the interchangeability of components (a) and (b).

In further accordance with the present invention, a process for polymerizing alpha-olefins is provided. In this process at least one alpha-olefin is polymerized, under alpha-olefin polymerization conditions, in the presence of a catalytically effective amount of the catalyst of the present invention and in the further presence of a co-catalytically effective amount of a trialkylaluminum compound.

DETAILED DESCRIPTION

The catalyst component of the present invention comprises the reaction product of a series of six independent compounds. The first two compounds are a silicon-containing compound and a magnesium dihydrocarbyl. The order of addition of these two compounds is independent. That is, either component may be added to the other to produce a first reaction product.

The silicon-containing compound, the first component, has the structural formula $$R_{n-4}SiX_n \qquad (I)$$

where R is $C_1$-$C_{10}$ hydrocarbyl; X is halogen; and n is an integer of 1 to 4. Preferably, the silicon-containing compound has the structural formula I where R is $C_1$-$C_{10}$ alkyl; X is chlorine or bromine and n is an integer of 2 to 4. More preferably, the silicon-containing compound is characterized by structural formula I where R is $C_1$-$C_4$ alkyl; X is chlorine or bromine; and n is an integer of 3 or 4. Still more preferably, the silicon-containing compound is defined by structural formula I where X is chlorine or bromine and n is 4. Most preferably, the silicon-containing compound is silicon tetrachloride.

Among the silicon-containing compounds within the contemplation of the present invention are dimethylsilicon dichloride, methylsilicon trichloride, diethylsilicon dichloride, triethylsilicon chloride, ethylsilicon trichloride, di-n-butylsilicon dibromide di-n-propylsilicon dichloride, n-butylsilicon tribromide, di-n-butylsilicon dichloride, trimethylsilicon chloride, triethylsilicon bromide, silicon tetrabromide, silicon tetrachloride and the like. It is emphasized that this group is non-inclusive and other compounds within generic formula of the silicon-containing compound of this invention are within the contemplation of this invention. Of the silicon-containing compounds within the contemplation of this invention silicon tetrabromide and silicon tetrachloride are particularly preferred, with silicon tetrachloride most preferred.

The second component, reacted with the silicon-containing compound, included in the catalyst of the instant invention, is a magnesiumdialkyl having the structural formula $$R^1R^2Mg \qquad (II)$$

where $R^1$ and $R^2$ are the same or different and are $C_2$-$C_{10}$ alkyl. Preferably, the magnesiumdialkyl has the structural formula I where $R^1$ and $R^2$ are the same or different and are $C_2$-$C_6$ alkyl. More preferably, the magnesiumdialkyl is characterized by the structural formula II where $R^1$ and $R^2$ are the same or different and are $C_2$-$C_4$ alkyl.

Included among the magnesiumdialkyl compounds within the contemplation of this invention are diethylmagnesium, di-n-propylmagnesium, diisopropylmagnesium, di-n-butylmagnesium, n-butyl-sec-butylmagnesium, ethylbutylmagnesium, n-propyl-n-butyl-magnesium and the like. Again, this grouping is given for illustrative purposes only and the many other compounds within the generic meaning of structural formula II, not mentioned above, are within the contemplation of this invention. Of particular applicability in the catalyst of this invention is the use of di-n-butylmagnesium and n-butyl-sec-butylmagnesium.

As stated above, the silicon-containing compound and the magnesiumdialkyl compound are reacted with each other in either order. That is, the silicon-containing compound may be added to the magnesiumdialkyl or vice versa. It is preferred, however, to add the magnesiumdialkyl to the silicon-containing compound.

This reaction is preferably conducted in solution. A common solvent for the silicon-containing compound and the magnesiumdialkyl is usually employed. A preferred solvent for use in this application is a $C_5$-$C_{10}$ alkane. Among the preferred alkanes useful as the solvent in the reaction of the silicon-containing compound and the magnesium dialkyl compound are hexane and heptane. Heptane is particularly applicable for this application.

The reaction product of the silicon-containing compound and the magnesiumdialkyl is, in turn, reacted with an alcohol. The alcohol, useful in the formation of the catalyst of this invention, is characterized by structural formula $$R^3OH \qquad (III)$$

where $R^3$ is $C_1$-$C_{10}$ hydrocarbyl. Preferably, the alcohol of the present invention is defined by structural formula III where $R^3$ is $C_1$-$C_{10}$ alkyl. Thus, it is preferred that the alcohol be an alkanol. More preferably, the alcohol having the structural formula III is defined by $R^3$ being $C_1$–$C_6$ alkyl. Still more preferably, the alcohol having the structural formula III has a $R^3$ meaning of $C_1$–$C_4$ alkyl. Yet still more preferably, the alcohol has the structural formula III where $R^3$ is $C_1$–$C_2$ alkyl. Most preferably, the alcohol component used in the formation of the catalyst of this invention is ethanol.

Among the preferred alcohols useful in this application are methanol, ethanol, n-propanol, isopropanol, n-butanol and the like. Of these, methanol, ethanol, isopropanol and n-propanol are particularly preferred. Ethanol, as stated in the above paragraph, is particularly preferred in this application.

As in the formation of the reaction product of the silicon-containing and magnesiumdialkyl compounds, the third reactant, the alcohol, reacted with the reaction product of the silicon-containing and magnesiumdialkyl compounds, is introduced into the reaction in solution. Again, the preferred solvent for the alcohol is a $C_5$–$C_{10}$ alkane, the preferred members of which are, again, hexane and heptane.

The reaction product of the first three above-enumerated components is reacted with a fourth component, a halide-containing metal compound, the metal of which is selected from the group consisting of titanium, zirconium and vanadium. Preferably, the halide-containing metal compound within the contemplation of the fourth component of the catalyst of the present invention, in the event that the metal is titanium or zirconium, is defined by the structural formula $$M(OR^4)_{p-4}X^1_p \qquad (IV)$$

where M is titanium or zirconium; $R^4$ is $C_1$–$C_6$ alkyl; $X^1$ is halogen; and p is an integer of 1 to 4. More preferably, the compound characterized by structural formula IV is defined by M being titanium or zirconium; $R^4$ is $C_1$–$C_4$ alkyl; $X^1$ is bromine or chlorine; and p is an integer of 2 to 4. Still more preferably, the compound characterized by the structural formula IV where p is an integer of 3 to 4. Most preferably, the titanium or zirconium compound having the structural formula IV is characterized by p being 4.

Alternatively, in the preferred embodiment wherein the halide-containing metal is vanadium, the compound is characterized by a structural formula selected from the group consisting of $$VX^1_4 \qquad (V)$$

or $$VOX^1_3 \qquad (VI)$$

where $X^1$ has the meanings given for the compound having the structural formula IV.

Preferred embodiments of the halide-containing metal compound of the catalyst of this invention include titanium tetrachloride, titanium tetrabromide, vanadium tetrachloride, vanadium tetrabromide, vanadium oxytrichloride, vanadium oxytribromide, zirconium tetrachloride, zirconium tetrabromide, ethoxytitanium trichloride, methoxytitanium tribromide, dipropoxyzirconium dichloride, dibutoxyzirconium dichloride and the like. Among the above preferred halide-containing metal compounds, titanium tetrachloride, titanium tetrabromide, vanadium tetrachloride, vanadium tetrabromide, vanadium oxytrichloride, vanadium oxytribromide, zirconium tetrachloride and zirconium tetrabromide are more preferred. Still more preferably, the halide-containing compound is titanium tetrachloride or titanium tetrabromide, with titanium tetrachloride being most preferred.

As in the process of the first three components, the reaction step of incorporating the fourth component of the catalyst of the present invention, the halide-containing metal compound, is preferably conducted by dissolving the halide-containing metal compound in a solvent. As in the earlier reaction steps, the solvent for the fourth component is again preferably a $C_5$–$C_{10}$ alkane, with hexane or heptane being particularly preferred.

The reaction product of the first three components with the halide-containing metal compound is reacted, in turn, with a fifth component, an aluminum compound having the structural formula $$Al(OR^5)_3 \qquad (VII)$$

where $R^5$ is $C_2$–$C_4$ alkyl. Preferably, the aluminum compound having the structural formula VII is characterized by $R^5$ being $C_3$–$C_4$ alkyl. More preferably, the aluminum compound is defined by structural formula VII where $R^5$ is $C_4$ alkyl. Most preferably, the aluminum compound having the structural formula VII is defined by $R^5$ being sec-butyl.

Compounds within the contemplation of the aluminum component of the catalyst of this invention include aluminum triethoxide, aluminum tri-n-propoxide, aluminum tri-n-butoxide, aluminum tri-sec-butoxide, aluminum tri-tert-butoxide and the like. Of these, aluminum tri-sec-butoxide is particularly preferred.

The aluminum-containing compound is combined into the catalyst of the present invention in accordance with the procedures utilized in the incorporation of the earlier described components. That is, the reaction product of the first four components is reacted with the aluminum-containing compound. As is the case in the earlier components, the aluminum-containing component is preferably reacted with the reaction product in solution. Therefore, the aluminum-containing compound is dissolved in a solvent, which is, again, in a preferred embodiment, a $C_5$–$C_{10}$ alkane. As in the earlier compounds the preferred $C_5$–$C_{10}$ alkane solvents are hexane and heptane.

The sixth and final component which, when reacted with the reaction product of the first five components, completes the formation of the catalyst of the present invention, is a halide-containing metal compound. Although the halide-containing metal compound constituting the sixth component of the catalyst of this invention need not be identical with the fourth component, another halide-containing metal compound, it encompasses the same compounds as defined for the fourth component of the catalyst of this invention. The preferences recited in the discussion of the fourth component apply equally to the degree of preference of compounds within the generic meaning of the sixth component. Of course, the halide-containing metal compound constituting the sixth component of the catalyst, may be the same compound as the compound constituting the earlier discussed fourth component halide-containing metal compound. Suffice it to say, the preferred, still more preferred and most preferred embodiments of the halide-containing metal compound sixth component, as well as the exemplifications thereof, are identical with that of the halide-containing metal compound fourth component of this catalyst. When the most preferred embodiment of both the fourth and the sixth components are used, the compound is titanium tetrachloride and the compound utilized for the fourth and sixth reacting component of the catalyst is obviously the same.

The incorporation of the sixth component into the catalyst of this invention is, like the first five components, preferably conducted in solution. That is, the halide-containing metal compound is dissolved in a solvent which, as in the earlier components, is preferably a $C_5$–$C_{10}$ alkane of which hexane and heptane are the preferred embodiments.

It is emphasized that the sequence of addition of the six components that are reacted together to form the catalyst of this invention is as recited hereinabove. The only exception to this requirement is the interchangeability of the first two components. That is, the first recited component, the silicon-containing compound, may be added to the magnesiumdialkyl, rather than adding the magnesiumdialkyl to the silicon-containing compound.

The formation of the catalyst preferably is conducted utilizing specific concentrations of the above discussed components. For convenience, these concentration ranges are predicated on the basis of the molar concentration of the magnesiumdialkyl, the compound having the structural formula II. Thus, in a preferred embodiment, the molar ratio of the compound having the structural formula II to the silicon-containing compound having the structural formula I is in the range of between about 0.1:1 and about 10:1. More preferably, this ratio is in the range of between about 0.2:1 and about 1:1. Most preferably, the molar ratio of compound II to compound I is in the range of between about 0.4:1 and 0.6:1.

The molar ratio of the magnesiumdialkyl reacted in the formation of the catalyst to the amount of alcohol, the compound having the structural formula III, reacted in the formation of the catalyst, is preferably in the range of between about 0.1:1 and about 10:1. This molar ratio is more preferably in the range of between about 0.2:1 and about 1:1. Most preferably, the molar ratio of these reactants is in the range of between about 0.4:1 and about 0.6:1.

The amount of compound having the structural formula IV or, in the case where the metal is vanadium, structural formula V or VI, reacted, as expressed as the molar ratio of the amount of compound II to compound IV, V or VI is preferably in the range of between about 0.1:1 and about 10:1. More preferably, this molar ratio of the magnesium-containing compound to the compound having the structural formula IV, V or VI is in the range of between about 0.25:1 and about 5:1. Most preferably, this molar ratio is in the range of between about 0.5:1 and about 2:1.

The concentration of the fifth component, the aluminum-containing compound having the structural formula VII, reacted in the formation of the catalyst, as manifested by the molar ratio of the concentration of the magnesiumdialkyl compound having the structural formula II reacted to that of the compound having the structural formula VII is preferably in the range of between about 0.05:1 and about 20:1. The molar ratio of compound II to compound VII is more preferably in the range of between about 0.1:1 and about 10:1. Most preferably, this ratio is in the range of between about 0.5:1 and about 5:1.

The last component utilized in the synthesis of the catalyst, the sixth component having the same structural formulae as compounds IV, V and VI, is present in the catalyst in a concentration such that the molar ratio of compound II to the sixth component is preferably in the range of between about 0.05:1 and about 10:1, more preferably, between about 0.1:1 and about 5:1 and most preferably, between about 0.1:1 and about 5:1 and most preferably, between about 0.25:1 and about 1:1.

In a preferred embodiment the catalyst may be formulated with the inclusion of an additional reaction step. In this preferred embodiment the above recited processing scheme for manufacturing the subject catalyst is retained. However, the processing steps include the additional step of initially reacting the silicon-containing compound having the structural formula I, the first component, with an aluminum compound.

The aluminum compound reacted with the silicon-containing compound has the structural formula VII. Indeed, the description given supra regarding the fifth compound defines the aluminum-containing compounds within the contemplation of this preferred embodiment. Thus, the preferred, more preferred and most preferred embodiments of the compound having the structural formula VII of the fifth compound are identical to the preferred, more preferred and most preferred embodiments of the aluminum-containing compound reacted with the silicon-containing compound. It follows, therefore, that it is particularly preferred that the aluminum-containing compound reacted with the silicon-containing compound, in this preferred embodiment be the same as the compound which is utilized as the fifth component in the formulation of the subject catalyst. Thus, it is particularly preferred that this compound be aluminum tri-sec-butoxide.

In another preferred embodiment the catalyst includes an inert inorganic support. That is, in an another preferred embodiment of the catalyst of this invention, the catalyst is prepared in accordance with the procedure set forth above with the additional inclusion of an inert inorganic additive, which acts as the support, is introduced prior to the introduction of the above recited components which are combined to produce the catalyst of this invention.

Preferably, the inert inorganic additive which acts as the support is an inorganic oxide. Among the inorganic oxides within the contemplation of the present invention are silica, alumina, zirconia, beryllia and the like. Of particular application as the inert inorganic support is silica and alumina. Silica is particularly preferred in this application.

The catalyst of the present invention is utilized in the polymerization of alpha-olefins. As is common in the catalytic formation of alpha-olefin polymers, a co-catalyst is utilized with the catalyst of this invention wherein, of course, both catalyst and co-catalyst are present in catalytically and co-catalytically effective amounts, under suitable alpha-olefin polymerization conditions, to produce the polymeric product.

The co-catalyst of the present invention is an organoaluminum compound Preferably, the organoaluminum compound is a trialkylaluminum compound characterized by the structural formula $$AlR^6_3 \qquad (VIII)$$

where $R^6$ is $C_2-C_6$ alkyl. More preferably, the aluminum compound having the structural formula VIII is defined by $R^6$ being $C_2-C_4$ alkyl.

Preferred co-catalysts within the contemplation of the present invention include triethylaluminum, tri-n-propylaluminum, triisopropylaluminum, tri-n-butylaluminum, tri-sec-butylaluminum, tri-tert-butylaluminum and the like. Of these, triethylaluminum is particularly preferred.

The polymerization of at least one alpha-olefin occurs under olefin polymerization conditions. These conditions, in general, embody a temperature of reaction in the range of from about 100° F. to about 220° F., preferably about 140° F. to about 200° F. and most preferably, about 160° F. to about 180° F. The pressure of the olefin polymerization reaction is in the range of from about 50 psi to about 1,000 psi. Preferably, the pressure of reaction is in the range of from about 100 psi to about 600 psi. Most preferably, the pressure of the reaction is in the range of from about 300 psi to about 400 psi.

A particularly preferred embodiment of the process of the present invention involves the copolymerization of ethylene and a higher alpha-olefin, preferably a $C_4-C_{10}$ alpha-olefin, the polymerization product of which is commonly identified as linear low density polyethylene (LLDPE). The higher alpha-olefin comonomer employed in the polymerization, which is usually present in the LLDPE in a weight concentration of up to about 10% by weight, although introduced into the polymerization reactor in higher concentration than that, is, in a preferred embodiment, 1-butene. In this polymerization reaction, ethylene and a higher alpha-olefin are introduced into the reactor in the presence of the catalyst and co-catalyst under the thermodynamic conditions recited above.

The polymerization reactor, in addition to ethylene and the higher alpha-olefin, is also charged with hydrogen. Hydrogen gas has the effect of modifying the degree of polymerization of the LLDPE produced therein. This is manifested by an increase in melt index compared to the melt index which would characterize the polymerization product in the absence of hydrogen. Thus, in the preferred embodiment wherein LLDPE is polymerized two comonomers, ethylene and 1-butene, are charged into a reactor that is continuously fed hydrogen.

The following examples are given to illustrate the scope of the present invention. Because these examples are given for illustrative purposes only, it is understood that the scope of the present invention is not limited thereto.

EXAMPLE 1

Preparation of Catalyst

Silicon tetrachloride (16 ml, 0.14 mole) in heptane (75 ml) was added to a 500 ml, four-necked flask provided with a 60 ml addition funnel, condenser, thermometer and mechanical stirrer. The silicon tetrachloride in solution was heated in the flask to reflux temperature. A 0.68M solution of dibutylmagnesium in heptane (0.07 mole, 103 ml) was added dropwise to the flask. The combined contents of the flask were refluxed for one hour, resulting in the formation of a white solid. Ethanol (0.14 mole, 8.2 ml), dissolved in heptane (15 ml), was added dropwise to the slurry and the contents were refluxed for one-half hour. At that point, titanium tetrachloride (0.07 mole, 7.7 ml), dissolved in heptane (10 ml), was added and refluxing was continued for an additional two hours. The slurry was cooled to room temperature, the liquid decanted and the white solid washed three times, each time with hexane (100 ml).

The thus washed white solid was suspended in hexane (150 ml). Aluminum tri-sec-butoxide (0.07 mole, 17.8 ml), dissolved in hexane (25 ml), was added to the slurry. The flask containing this slurry was heated to reflux temperature for one-half hour followed by the addition of titanium tetrachloride (0.28 mole, 30.8 ml), dissolved in hexane (15 ml). This product, in turn, was refluxed for an additional two and one-half hours to produce a golden yellow solid.

The slurry was cooled to room temperature, the liquid decanted and the solid washed five times, each time with hexane (150 ml). The solvent was evaporated, utilizing a nitrogen purge followed by vacuum, to yield 31.1 grams of a pale yellow solid.

EXAMPLE 2

Copolymerization of Ethylene and 1-Butene

A one-gallon reactor was filled with 190 ml of 1-butene and 1200 ml of isobutane. The reactor was heated to 170° F. To the thus heated contents of the reactor were added 0.02 gram of the catalyst formed in Example 1 and 1 ml of a 25 weight percent solution of triethylaluminum in hexane. The reactor was sealed and pressurized with hydrogen (29 psi) and ethylene (123 psi). In addition, ethylene gas was fed into the reactor on demand during the polymerization reaction. After conducting the polymerization reaction for one hour, the contents of the reactor were removed and the volatile liquids evaporated.

The polymer product obtained in this reaction, 227 grams, was characterized by a melt index, as measured by ASTM D-1238, of 1.35, a melt index ratio (MIR) of 42.3 and a density of 0.9205.

COMPARATIVE EXAMPLE 1 (CE 1)

Preparation of Prior Art Catalyst

Silicon tetrachloride (0.14 mole, 16 ml), dissolved in heptane (75 ml), was added to a 500 ml, four-necked flask provided with a 60 ml addition funnel, condenser, thermometer and mechanical stirrer. The silicon tetrachloride solution was then heated to reflux temperature whereupon a 0.68M solution of dibutylmagnesium in heptane (0.07 mole, 103 ml) was added and the contents refluxed for one hour. The product of this reaction was a white solid. To the thus formed slurry was added, dropwise, ethanol (0.14 mole, 8.2 ml), dissolved in heptane (15 ml). The slurry was refluxed for one hour whereupon titanium tetrachloride (0.07 mole, 7.7 ml), dissolved in heptane (15 ml), was added. An additional two hours of refluxing followed this addition.

The slurry was then cooled to room temperature, the liquid decanted and the solid washed five times with hexane (100 ml). The remaining solvent was evaporated, with a nitrogen purge followed by vacuum, to yield 9.6 grams of a cream-colored solid.

COMPARATIVE EXAMPLE 2 (CE 2)

Copolymerizing Ethylene and 1-Butene With Prior Art Catalyst

A copolymer of ethylene and 1-butene was formed in accordance with the procedure of Example 2 except that 0.001 g of the catalyst formed in accordance with Comparative Example 1 was substituted for the catalyst of Example 1. The sealed reactor was pressurized with hydrogen (42 psi) and ethylene (120 psi).

It is noted that the reason for this diminished concentration of catalyst, only 5% by weight as much as that used in Example 2, is because the prior art catalyst, although inferior to the catalyst of Example 1 for the reasons given hereinafter, is far more active. In order to obtain a similar polymeric yield, therefore, the catalyst concentration of this example was significantly reduced.

The polymer obtained in this reaction, 181 grams, was characterized by a melt index, as measured by ASTM D-1238, of 1.04, a melt index ratio (MIR) of 42.3 and a density of 0.9269.

DISCUSSION OF EXAMPLES 1, 2, CE1 and CE2

The catalyst formed in Example 1, in accordance with the present invention, produced an especially effective LLDPE, as evidenced by Example 2. On the other hand, the catalyst representative of the closest prior art, the catalyst of Comparative Example 1, produced a less effective LLDPE, as evidenced by Comparative Example 2.

The LLDPE of Example 2 was characterized by a melt index of 1.35. To produce this acceptable degree of polymerization, only 29 psi of hydrogen gas was maintained in the reactor during the polymerization reaction. To produce a slightly less effective, but still satisfactory LLDPE, characterized by a higher melt index of 1.04, utilizing the prior art catalyst of Comparative Example 1, required a higher hydrogen concentration than that required in Example 2. Thus, in Comparative Example 2 a hydrogen pressure of 42 psi, compared to only 29 psi in Example 1, was required. This result emphasizes the improved hydrogen response of the catalyst of the present invention over that of the closest prior art.

Similarly, the polymerization reaction of Example 2 was conducted with a charge of 190 ml of 1-butene. This polymerization reaction, using the catalyst of the present invention, formulated in Example 1, produced 227 grams of polymer having a density of 0.9205. However, the same quantity of 1-butene, utilizing substantially the same concentration of ethylene, 120 psi vs. 123 psi, in Example 2, produced only 181 grams of polymer of a higher density, 0.9269 g/cc. This result evidences the greater alpha-olefin incorporation capability of the catalyst of the present invention over that of the closest prior art. Moreover, the aim of producing a linear low density polyethylene is obviously more successfully met utilizing the catalyst of the present invention in that the polyethylene has a significantly lower density.

EXAMPLE 3

Preparation of Catalyst

The preparation of a reaction product of silicon tetrachloride, dibutylmagnesium and ethanol was conducted in exact accordance with the procedure of Example 1. Thereafter, this reaction product, slurried in heptane, was refluxed for one hour, rather than the one-half hour of Example 1. To this slurry was added titanium tetrachloride (0.035 mole, 3.85 ml), dissolved in heptane (10 ml). This mixture was refluxed for two hours. Aluminum tri-sec-butoxide (0.07 mole, 17.8 ml), dissolved in heptane (20 ml), was added and refluxed together with the white solid reaction product for an additional one-half hour. Titanium tetrachloride (0.15 mole, 15.4 ml) was added to this product followed by refluxing for an additional two hours.

The reaction mixture was cooled to room temperature, the liquid decanted and the solid washed five times, each time with hexane (100 ml). The remaining solvent was evaporated, with a nitrogen purge followed by vacuum, to yield 17.1 grams of a pale yellow solid.

EXAMPLE 4

Copolymerization of Ethylene and 1-Butene

Ethylene and 1-butene were copolymerized in accordance with the procedure of Example 2, except that 266 ml of 1-butene, rather than the 190 ml used in Example 2, and 0.011 gram of the catalyst prepared in Example 3, rather than the 0.02 gram of the catalyst of Example 1, were used. The reactor was pressurized with 47 psi hydrogen and 119 psi ethylene.

The result of this polymerization reaction was the obtaining of 170 grams of polymer characterized by a melt index of 1.97, an MIR of 43.9 and a density of 0.9201.

EXAMPLE 5

Preparation of Catalyst

Silicon tetrachloride (0.14 mole, 16 ml), aluminum tri-sec-butoxide (0.0175 mole, 4.5 ml) and heptane (75 ml) were added to a 500 ml flask of the type defined in Example 1. The solution was then heated to reflux temperature. A 0.68M solution of dibutylmagnesium in heptane (0.07 mole, 103 ml) was added thereto and the contents refluxed for one hour to produce a white solid. Ethanol (0.14 mole, 8.2 ml), dissolved in heptane. (15 ml), was added dropwise thereto. After refluxing for one hour, titanium tetrachloride (0.07 mole, 7.7 ml), dissolved in heptane (10 ml), was added and refluxing continued for an additional one and one-half hours. Aluminum tri-sec-butoxide (0.035 mole, 8.9 ml), dissolved in heptane (10 ml), was added and refluxed with the white solid slurry for one-half hour. Titanium tetrachloride (0.14 mole, 15.4 ml) was then added, followed by refluxing for an additional three hours.

The reaction mixture was cooled to room temperature and allowed to stand overnight. The liquid was then decanted and the solid washed five times, each time with hexane (150 ml). The remaining solvent was evaporated with a nitrogen purge followed by vacuum to give 19.1 grams of a pale yellow solid.

EXAMPLE 6

Copolymerization of Ethylene and 1-Butene

Ethylene and 1-butene were copolymerized in accordance with the general procedure of Example 2. However, the amounts of the reactants were not identical with those of Example 2. The amount of 1-butene charged was 266 ml. Moreover, the catalyst utilized in the polymerization of Example 2, the catalyst of Example 1, was replaced with the catalyst formed in Example 5 in an amount of 0.009 gram. The polymerization reactor, in this example, was pressurized with hydrogen (34 psi) and ethylene (122 psi).

The polymer product of this reaction was obtained in a quantity of 282 grams. It was characterized by a melt index of 1.34, an MIR of 34.0 and a density of 0.9219.

EXAMPLE 7

Preparation of Catalyst

A reaction product of silicon tetrachloride, dibutyl-magnesium and ethanol was produced in accordance with the procedure of Example 1 except that this reaction product was refluxed for one hour, rather than the one-half hour used in Example 1. The procedure of Example 1 was also followed in the reaction of this reaction product with titanium tetrachloride but for the refluxing of this reaction for one and one-half hours, rather than the two hours of Example 1.

To this reaction product was added aluminum tri-sec-butoxide (0.035 mole, 8.9 ml), dissolved in heptane (10 ml), followed by the addition of titanium tetrachloride (100 ml). Upon addition of these two components to the reaction product in the flask, the contents of the flask were heated to reflux temperature for two hours, reaching an ultimate temperature of 117° C.

The contents were then cooled to room temperature, the liquid decanted and the solvent washed seven times with hexane (150 ml). The remaining solvent was evaporated with a nitrogen purge followed by vacuum to provide 18.7 grams of a brownish-gold solid.

EXAMPLE 8

Copolymerization of Ethylene and 1-Butene

Ethylene and 1-butene were copolymerized in accordance with the procedure in Example 2 except that the catalyst of Example 7 was substituted for the catalyst of Example 1 and was present in an amount of 0.003 gram. The concentration of 1-butene was 342 ml and the reactor was pressurized with 32 psi of hydrogen and 123 of psi of ethylene.

The polymer obtained amounted to 232 grams and was characterized by a melt index of 2.43, an MIR of 41.1 and a density of 0.9102.

EXAMPLE 9

Preparation of Catalyst

A reaction product of silicon tetrachloride, dibutyl-magnesium, ethanol and titanium tetrachloride was formed in exact accordance with the procedure of Example 7. At this point, the reaction product, in a heptane slurry, was cooled to room temperature, the liquid decanted and the solid washed once with heptane (50 ml).

Aluminum tri-sec-butoxide (0.035 mole, 8.9 ml) and heptane (100 ml) were added and refluxed with the white solid reaction product for one-half hour. Vanadium oxytrichloride (0.07 mole, 6.6 ml), dissolved in heptane (10 ml), was added, followed by refluxing for one and one-half hours.

After cooling to room temperature, the liquid was decanted and the solid washed five times with hexane (150 ml). The remaining solvent was evaporated with a nitrogen purge followed by vacuum to give 17.4 grams of a gray solid.

EXAMPLE 10

Copolymerization of Ethylene and 1-Butene

Ethylene and 1-butene were copolymerized in accordance with the procedure of Example 2 except that 266 ml of 1-butene and 0.31 gram of the catalyst, prepared in accordance with Example 9, were used. The reactor was pressurized with 28 psi of hydrogen and 123 psi of ethylene.

The polymer obtained had a melt index of 1.35, an MIR of 59.9 and a density of 0.9184. It was obtained in a yield of 329 grams.

EXAMPLE 11

Preparation of Catalyst

A reaction product of silicon tetrachloride, dibutyl magnesium, ethanol and titanium tetrachloride were formed in accordance with the procedure of Example 7 except that the reaction product of the first three named components with titanium tetrachloride was refluxed for two hours, rather than one and one-half hours. The slurry of the reaction product of the four components was then cooled to room temperature, the liquid decanted and the solid washed five times with hexane (100 ml).

Another 125 ml of hexane was added to the washed reaction product and the slurry heated to reflux temperature. Aluminum tri-sec-butoxide (0.07 mole, 17.8 ml) was added to the washed reaction product and refluxed together with the white solid reaction product for one hour. Titanium tetrachloride (0.14 mole, 15.4 ml), dissolved in hexane (15 ml), was added, followed by refluxing for two hours.

After cooling to room temperature, the liquid was decanted and the solid washed five times with hexane (100 ml). The remaining solvent was evaporated with a nitrogen purge followed by vacuum to give 22.5 grams of a straw colored solid.

EXAMPLE 12

Copolymerization of Ethylene and 1-Butene

Ethylene and 1-butene were copolymerized in accordance with the procedure of Example 2 except that 0.01 gram of the catalyst prepared in Example 11 replaced the catalyst of Example 1 and that the amount of 1-butene charged was 266 ml. The reactor was pressurized with hydrogen and ethylene, as in Example 2. However, the hydrogen was charged at a pressure of 20 psi and the ethylene at a pressure of 125 psi.

The polymer obtained amounted to 205 grams and had a melt index of 1.84, an MIR of 42.7 and a density of 0.9109.

COMPARATIVE EXAMPLE 3

Copolymerization of Ethylene and 1-Butene

Ethylene and 1-butene were copolymerized in accordance with the procedure of Example 2 except that 266 ml of 1-butene and 0.001 gram of the catalyst prepared in Comparative Example 1 were used. The reactor was pressurized with 43 psi of hydrogen and 120 psi of ethylene.

The polymer thus produced was obtained in the yield of 113 grams and was characterized by a melt index of 1.15, an MIR of 32.5 and a density of 0.9220.

EXAMPLE 13

Preparation of Catalyst

A reaction product of silicon tetrachloride, dibutyl-magnesium, ethanol and titanium tetrachloride was formed in accordance with the procedure of Example 11. Thereafter, the reaction product was slurried in 100 ml of hexane and half of the slurry removed to another container.

The slurry remaining in the 500 ml flask was diluted with another 75 ml of hexane. Aluminum tri-sec-butoxide (0.0175 mole, 4.45 ml) was added and refluxed with the white solid reaction product for one hour. Titanium tetrachloride (0.07 mole, 7.7 ml), dissolved in hexane (10 ml), was added, followed by refluxing for two hours to produce a yellow solid.

After cooling to room temperature, the liquid was decanted and the solid washed five times with hexane (100 ml). The remaining solvent was evaporated with a rotary evaporator to yield 8.4 grams of solid.

EXAMPLE 14

Copolymerization of Ethylene and 1-Butene

Ethylene and 1-butene were copolymerized in accordance with the procedure of Example 1 except that 0.003 gram of the catalyst formed in Example 13 was used. The reaction was pressurized with 22 psi of hydrogen and 125 psi of ethylene.

The yield of the polymer obtained in this polymerization reaction was 230 grams and was characterized by a melt index of 1.24, an MIR of 38.5 and a density of 0.9201.

EXAMPLE 15

Preparation of Catalyst

Silica (10 g.), previously dried at 1100° F., hexane (75 ml.) and dibutylmagnesium (51 ml. of a 0.68M solution in hexane) were introduced into a 500 ml. three-necked flask equipped with a condensor, a 60 ml. addition funnel and a mechanical stirrer. The flask was heated to boiling without cooling. The hexane evaporated leaving a mud-like product. The product was cooled to ambient temperature. Thereupon, heptane (75 ml.) was added to the mud and resultant slurry was heated to reflux temperature. Silicon tetrachloride (8 ml., 0.07 mole) dissolved in heptane (25 ml.) was added to the slurry which was then heated at reflux for 30 minutes. Ethanol (4.1 ml., 0.07 mole) dissolved in heptane (10 ml.) was then introduced into the slurry and heating at reflux was continued for an additional 30 minutes. A solution of titanium tetrachloride (7.7 ml., 0.07 mole) in heptane (10 ml.) was added and heating at reflux was maintained for another 45 minutes. After cooling to room temperature, the liquid was decanted and the solid product was washed 5 times with hexane (100 ml.). The washed solid was reslurried in heptane (125 ml.) and aluminum tri-sec-butoxide (4.45 ml., 0.0175 mole) was added thereto. The slurry was heated for two hours at reflux temperature. To this slurry was added a second charge of titanium tetrachloride (3.85 ml., 0.035 mole) dissolved in heptane (10 ml.). The slurry was again heated at reflux for yet another two hours.

After cooling to ambient temperature the liquid was decanted and the solids remaining were washed six times with hexane (100 ml.). The remaining solvent was evaporated utilizing a nitrogen purge followed by vacuum. The result was a pale yellow solid (24.0 g.).

EXAMPLE 16

Copolymerization of Ethylene and 1-Butene

A 1 gallon reactor was filled with 1-butene (266 cc.) and isobutane (1200 ml.) and heated to 76.5° C. To the contents of the reactor was added catalyst (0.035 g.) formed in accordance with the procedure of Example 15 along with a 25 wt % solution of triethylaluminum in hexane (1.0 cc.). The reactor was sealed and pressurized with hydrogen (34 psi) and ethylene (122 psi). The reactor was maintained at these conditions for 1 hour. During this time ethylene was fed into the reactor on demand. After 1 hour the reactor contents were removed and the volatile liquids evaporated.

The product of this reaction was a polymer (409 g.) characterized by a melt index of 1.63 and a density of 0.9171 g/cc.

The above embodiments and examples are given to illustrate the scope and spirit of the present invention. These embodiments and examples will make apparent, to those skilled in the art, other embodiments and examples. These other embodiments and examples are within the contemplation of the present invention. Therefore, it is understood that the instant invention is limited only by the appended claims.

What is claimed is:

1. A process for the polymerization of at least one alpha-olefin comprising polymerizing at least one alpha-olefin, under polymerization conditions, in the presence of
   (1) a catalytically effective amount of a catalyst comprising the reaction product of:
      (a) a silicon-containing compound having the structural formula $R_{4-n}SiX_n$, where R is $C_1$–$C_{10}$ hydrocarbyl; X is halogen; and n is an integer of 1 to 4;
      (b) a magnesiumdialkyl having the structural formula $R^1R^2Mg$, where $R^1$ and $R^2$ are the same or different and are $C_2$–$C_{10}$ alkyl;
      (c) an alcohol having the structural formula $R^3OH$, where $R^3$ is $C_1$–$C_{10}$ hydrocarbyl;
      (d) a halide-containing metal compound, said metal selected from the group consisting of titanium, zirconium and vanadium;
      (e) an aluminum alkoxide having the structural formula $Al(OR^5)_3$, where $R^5$ is $C_2$–$C_4$ alkyl; and
      (f) a halide-containing metal compound, said metal selected from the group consisting of titanium, zirconium and vanadium, with the proviso that said reaction product is formed from said components reacted in the order recited but for the interchangeability of components (a) and (b); and
   (2) a co-catalytically effective amount of an organoaluminum compound.

2. A process for the polymerization of alpha-olefins comprising polymerizing at least one alpha-olefin, under polymerization conditions, in the presence of
   (1) a catalytically effective amount or a catalyst comprising the reaction product of:
      (a) a silicon-containing compound having the structural formula $R_{4-n}SiX_n$, where R is $C_1$–$C_{10}$ hydrocarbyl; X is halogen; and n is an integer of 1 to 4;
      (b) a magnesiumdialkyl having the structural formula $R^1R^2Mg$, where $R^1$ and $R^2$ are the same or different and are $C_2$–$C_{10}$ alkyl;
      (c) an alcohol having the structural formula $R^3OH$, where $R^3$ is $C_1$–$C_{10}$ hydrocarbyl;
      (d) a halide-containing metal compound, said metal selected from the group consisting of titanium, zirconium and vanadium;
      (e) an aluminum alkoxide having the structural formula $Al(OR^5)_3$, where $R^5$ is $C_2$–$C_4$ alkyl; and
      (f) a halide-containing metal compound, said metal selected from the group consisting of titanium, zirconium and vanadium, with the proviso that said reaction product is formed from said components reacted in the order recited but for the interchangeability of components (a) and (b), wherein said component (a) is reacted with an aluminum alkoxide having the structural formula Al(OR$^5$)$_3$, where R$^5$ is C$_2$–C$_4$ alkyl, which product is reacted with said component (b), and (2) a co-catalytically effective amount of a trialkyl aluminum compound having the structural formula AlR$^6{}_3$, where R$^6$ is C$_1$–C$_6$ alkyl.

3. A process for the polymerization of at least one alpha-olefin comprising polymerizing at least one alpha-olefin under polymerization conditions in the presence of (1) a catalytically effective amount of a catalyst comprising a reaction product of:
(a) a silicon-containing compound having the structural formula R$_{4-n}$SiX$_n$, where R is C$_1$–C$_{10}$ hydrocarbyl; X is halogen; and n is an integer of 1 to 4;
(b) dibutylmagnesium;
(c) ethanol;
(d) titanium tetrachloride;
(e) aluminum tri-sec-butoxide; and
(f) a compound selected from the group consisting of titanium tetrachloride and vanadium oxytrichloride with the proviso that said reaction product results from the reaction of said components (a) to (f) reacted in the order recited, and (2) a co-catalytically effective amount of a trialkylaluminum compound.

4. A process for the polymerization of at least one alpha-olefin comprising polymerizing at least one alpha-olefin under polymerization conditions in the presence of (1) a catalytically effective amount of a catalyst comprising a reaction product of:
(a) a silicon-containing compound having the structural formula R$_{4-n}$SiX$_n$, where R is C$_1$–C$_{10}$ hydrocarbyl; X is halogen; and n is an integer of 1 to 4;
(b) dibutylmagnesium;
(c) ethanol;
(d) titanium tetrachloride;
(e) aluminum tri-sec-butoxide; and
(f) a compound selected from the group consisting of titanium tetrachloride and vanadium oxytrichloride with the proviso that (I) said reaction product results from the reaction of said components (a) to (f) reacted in the order recited and (II) said reaction product includes silica introduced in said reaction product before or simultaneously with said component (a), and (2) a co-catalytically effective amount of triethylaluminum.

5. A process in accordance with claim 1 wherein said organoaluminum compound is a trialkylaluminum compound having the structural formula AlR$^6{}_3$, where R$^6$ is C$_1$–C$_{10}$ alkyl.

6. A process in accordance with claim 5 wherein R$^6$ is C$_1$–C$_6$ alkyl.

7. A process in accordance with claim 6 wherein said alpha-olefin is ethylene.

8. A process in accordance with claim 6 wherein said alpha-olefin is ethylene and an alpha-olefin selected from the group consisting of C$_3$–C$_{10}$ alpha-olefins.

9. A process in accordance with claim 8 wherein said alpha-olefin is ethylene and 1-butene.

10. A process in accordance with claim 9 wherein R$^6$ is ethyl.

* * * * *